(12) United States Patent
Baving et al.

(10) Patent No.: US 7,611,172 B2
(45) Date of Patent: Nov. 3, 2009

(54) PLUG-IN COUPLING

(75) Inventors: Hans-Juergen Baving, Mannheim (DE);
Peer Milnazik, Ludwigshafen (DE);
Bernhard Sichler, Gorxhaimertal (DE);
Gudrun Mannweiler, Mannheim (DE);
Michael Kropp, Edingen-Neckarhausen (DE); Lars Schiedhering, Schriesheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 590 days.

(21) Appl. No.: 10/563,689

(22) PCT Filed: Jul. 1, 2004

(86) PCT No.: PCT/EP2004/007132

§ 371 (c)(1),
(2), (4) Date: Apr. 19, 2006

(87) PCT Pub. No.: WO2005/003614

PCT Pub. Date: Jan. 13, 2005

(65) Prior Publication Data

US 2007/0001454 A1 Jan. 4, 2007

(30) Foreign Application Priority Data

Jul. 4, 2003 (DE) ................................ 103 30 408

(51) Int. Cl.
*F16L 19/08* (2006.01)
*F16L 21/00* (2006.01)
(52) U.S. Cl. .................. 285/340; 285/322; 285/331
(58) Field of Classification Search .................. 285/331, 285/340, 307, 322, 323
See application file for complete search history.

(56) References Cited

U.S. PATENT DOCUMENTS

| 4,722,558 | A  | * | 2/1988 | Badoureaux | 285/39 |
|---|---|---|---|---|---|
| 5,911,443 | A  | * | 6/1999 | Le Quere | 285/3 |
| 7,270,349 | B2 | * | 9/2007 | Bamberger et al. | 285/322 |
| 7,273,235 | B2 | * | 9/2007 | Coquard et al. | 285/308 |
| 7,404,581 | B2 | * | 7/2008 | Baying et al. | 285/242 |
| 2002/0163191 | A1 | * | 11/2002 | Muenster et al. | 285/331 |
| 2003/0001383 | A1 | * | 1/2003 | Halama | 285/39 |
| 2003/0067170 | A1 |   | 4/2003 | Snyder, Sr. et al. | |
| 2004/0245766 | A1 | * | 12/2004 | Vallee | 285/39 |

(Continued)

FOREIGN PATENT DOCUMENTS

DE 85 36 760 4/1989

(Continued)

*Primary Examiner*—James M Hewitt
(74) *Attorney, Agent, or Firm*—Jordan and Hamburg LLP

(57) ABSTRACT

A plug-in coupling for pipes includes a sealing element, a sleeve linked with the base and a retaining element including retaining claws for fixing the pipe end which is disposed in the interior of the sleeve. An annular gap between the base and the sleeve and receives the pipe end. While reducing production and assembly costs, the plug-in coupling ensures a durable and reliable connection and prevents the pipe end from being damaged and the retaining claws from penetrating the pipe end too deeply. The retaining element includes a closed annular part and is integrated into the sleeve and fixed therein with said part. The sleeve includes radially inside the retaining element a support element with an outer supporting face on which the spring-elastic retaining elements are supported. The supporting face is mounted at a predetermined angle which opens up towards the free front sleeve end.

9 Claims, 6 Drawing Sheets

U.S. PATENT DOCUMENTS

| | | | |
|---|---|---|---|
| 2005/0035597 A1* | 2/2005 | Bamberger et al. | 285/340 |
| 2005/0121910 A1* | 6/2005 | Muto | 285/322 |
| 2006/0125235 A1* | 6/2006 | Andre | 285/340 |

FOREIGN PATENT DOCUMENTS

| | | |
|---|---|---|
| DE | 199 35 246 | 12/2000 |
| DE | 2 830 071 | 3/2003 |
| DE | 102 21 971 | 6/2003 |
| EP | 1 178 255 | 2/2002 |
| FR | 2 830 071 | 3/2003 |

* cited by examiner

PLUG-IN COUPLING

BACKGROUND OF THE INVENTION

Plug-in connectors are known from DE 199 35 246 A1 and DE 102 21 971 A1, and contain a base body, an annular sealing element, a retaining element, and a sleeve that can be connected to the base body. A tube end that can be inserted into an annular gap between the base body and the sleeve can be fixed in the plug-in connector by means of the annular retaining element, which is also called a clamping ring, whereby the annular sealing element arranged on the base body is sealingly positioned against the interior surface of the inserted tube end. The retaining element is divided largely in the direction of the longitudinal axis of the plug-in connector by a gap and contains at least one claw that engages radially in the exterior surface of the tube end for fixing the latter in the plug-in connector. There can be difficulties in terms of functional fixation of the tube end in the plug-in connector, in particular as a result of production tolerances for the sleeve and for the retaining element that is divided in the longitudinal direction and furthermore for the tubes. Moreover, problems can occur due to the claw or claws of the retaining element penetrating too deep into the exterior surface of the tube, whereby disadvantageous damage to the intermediate metal layer can occur when the tube is embodied as a plastic/metal compound tube with an intermediate metal layer that is in particular made of aluminum.

Starting at this point, the object of the invention is to further develop the plug-in connector of the type cited in the foregoing such that high functionality of the connecting and fixing of the tube end in the plug-in coupling is attained with low production and assembly complexity. The plug-in connector should facilitate functionally correct handling during assembly, and should preclude the risk of assembly errors. The plug-in connector should also be able to be used for tubes made of different materials, such as plastic or metal or a composite thereof in the form of compound tubes, and for tubes made of comparatively soft materials or plastics, such as in particular polyethylene. It should be possible to produce the plug-in connector with no problem, and the plug-in connector should ensure a lasting and secure connection of tube to plug-in connector for many years. Furthermore, the plug-in connector should be able to be used in the field of sanitation, in particular for hot water and cold water installation. Above all, the plug-in connector should be able to reliably withstand changes in the material, in particular with regard to the dimensions or rigidity of the tube, that are caused by changes in temperature in the flowing medium, whereby functional sealing and connection should be assured for a service life that is decades-long.

BRIEF SUMMARY OF THE INVENTION

The inventive plug-in connector is distinguished by a functional design and by low production and assembly complexity. The base body that partially engages in the interior of the tube end ensures secure radial support of the tube end, so that the retaining forces are securely received and transmitted by means of the retaining element and there is secure sealing, even under changing operating conditions. The retaining element is embodied as a ring that is closed over the circumference, containing radially exteriorly an annular part that is closed over the circumference and radially interiorly claws that are arranged about a pre-specified angle inclined to the longitudinal axis, whereby the closed ring part is fixed in the sleeve and/or is integrated therein. The sleeve that is connected to the base body preferably contains two sleeve parts that are securely joined to one another, whereby the closed annular part of the retaining element is established in the connecting area of the two sleeve parts. When in the unloaded condition, the tongue-like claws of the retaining element in which the tube end is not inserted stand at a pre-specified angle to the longitudinal axis of the plug-in connector, whereby the aforesaid angle opens in the direction of the anterior free sleeve end and the edges of the aforesaid retaining claws, which edges are inclined to the longitudinal axis, point into the interior in the direction of the second posterior sleeve part.

In a preferred manner, allocated to the claws, hereinafter the retaining claws, of the retaining element is a support body situated on their interior side that faces the longitudinal axis. The support body is in particular embodied as an at least approximately conical annular shoulder of the anterior sleeve part. Alternatively, the support body can be embodied from segments, cams, or the like. Precise centering of the retaining element when the two sleeve parts are being joined is assured by means of the support body. Preferably the penetration depth of the retaining claws into the tube end is limited by means of the support body, this being of particular importance especially with compound tubes. The geometry of the sleeve is provided such that while the tube end is being inserted the interior diameter of the retaining element, i.e. its retaining claws, can enlarge by a pre-specified amount, for instance on the order of magnitude of 0.6 mm, so that the retaining claws lie against the exterior of the tube, i.e., on the tube exterior jacket, with pre-stress. When there is tensile strain, that is counter to the direction of insertion, the retaining claws only penetrate outward into the inserted tube by a pre-specified maximum amount. As a result of the inventive support element and/or the conical annular shoulder, the penetration depth is limited to a pre-specified maximum amount, preferably on the order of magnitude of 0.4 mm.

It should be noted at this point that given a compound tube with a dimension of 16 mm and with the tube having a total wall thickness of 2 mm, the exterior plastic layer, in particular the polyethylene layer, is 0.5 mm thick. In the case of greater tube wall thicknesses, in particular for tubes with dimensions of 20, 25, 32, and 40 mm, it is known that the tube wall thickness is correspondingly larger and is for instance 0.6 mm. In accordance with the invention, the support element is embodied such that and/or matched to the tube wall strength and in particular to the exterior layer of a compound tube such that the maximum penetration depth is less than the exterior layer of the tube by a pre-specified amount, so that the retaining claws are reliably prevented from penetrating into the metal layer.

The two sleeve parts, which are in particular embodied as plastic injection-molded parts, are preferably securely and lastingly joined to one another by means of ultrasonic welding. Prior to performing the welding, the retaining element is arranged between the two sleeve elements, whereby the retaining element is precisely centered by means of the aforesaid support element, in particular embodied as a conical annular shoulder, of the anterior sleeve part. The posterior sleeve part has a pre-determined welding geometry such that during the welding process its material is melted and used for additional weld material. Once joined, in particular once joined by welding, the sleeve is a uniform compact component into which the retaining element is preferably non-detachably integrated. A material-fit connection between the two sleeve parts is realized in a preferred manner using the welding, and the finished sleeve is a uniform, ultimately single-piece component. The retaining element is prevented from detaching from the sleeve, and incorrect positioning of the retaining element in the sleeve, and resultant malfunctions, especially reductions in the retaining and withdrawing forces, are also avoided. Alternatively, the sleeve can be produced and/or embodied in one piece as a plastic injection-molded part, whereby the retaining element is integrated directly into the sleeve during production.

As described in the foregoing, the retaining element contains an annular part that is fixed between the sleeve parts and/or integrated into the sleeve after the welding, so that, in contrast to an open retaining element or a retaining element embodied with an axial gap, there are no disadvantageous tolerance chains with the associated receiving diameters of the sleeve, whereby furthermore substantially improved dimensional stability is attained for the retaining element. The insertion forces and/or retaining forces are optimized due to the arrangement of the retaining claws at a pre-specified angle to the longitudinal axis, preferably between 20-45°, in particular between 25-40°, and usefully between 28-35°, and/or due to the exterior placement surface, preferably embodied as a cone, of the support body or annular shoulder.

The retaining claws are also very flexible as a result of the thus attained relative extension of the retaining claws, with the simultaneously relatively small receiving diameter of the retaining element in the sleeve and/or a small exterior diameter of the sleeve. The tube end can thus be inserted with a substantially minimized expenditure of force. Furthermore, the claws have a special shape in that the edges of the retaining claws that engage the exterior surface of the tube are embodied rounded and/or rounded off. This attains an additional reduction in the insertion force, since when it is inserted the tube end first strikes the exterior edges of the retaining claws. In addition, in the case of tensile force out of the plug-in coupling, the fact that the claw edge progressively penetrates into the tube effects an increase in the retaining force. The retaining claws inventively have an arched claw shape and/or scoop shape, which provides good dimensional stability.

Particular embodiments and further developments of the invention are provided in the following description.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
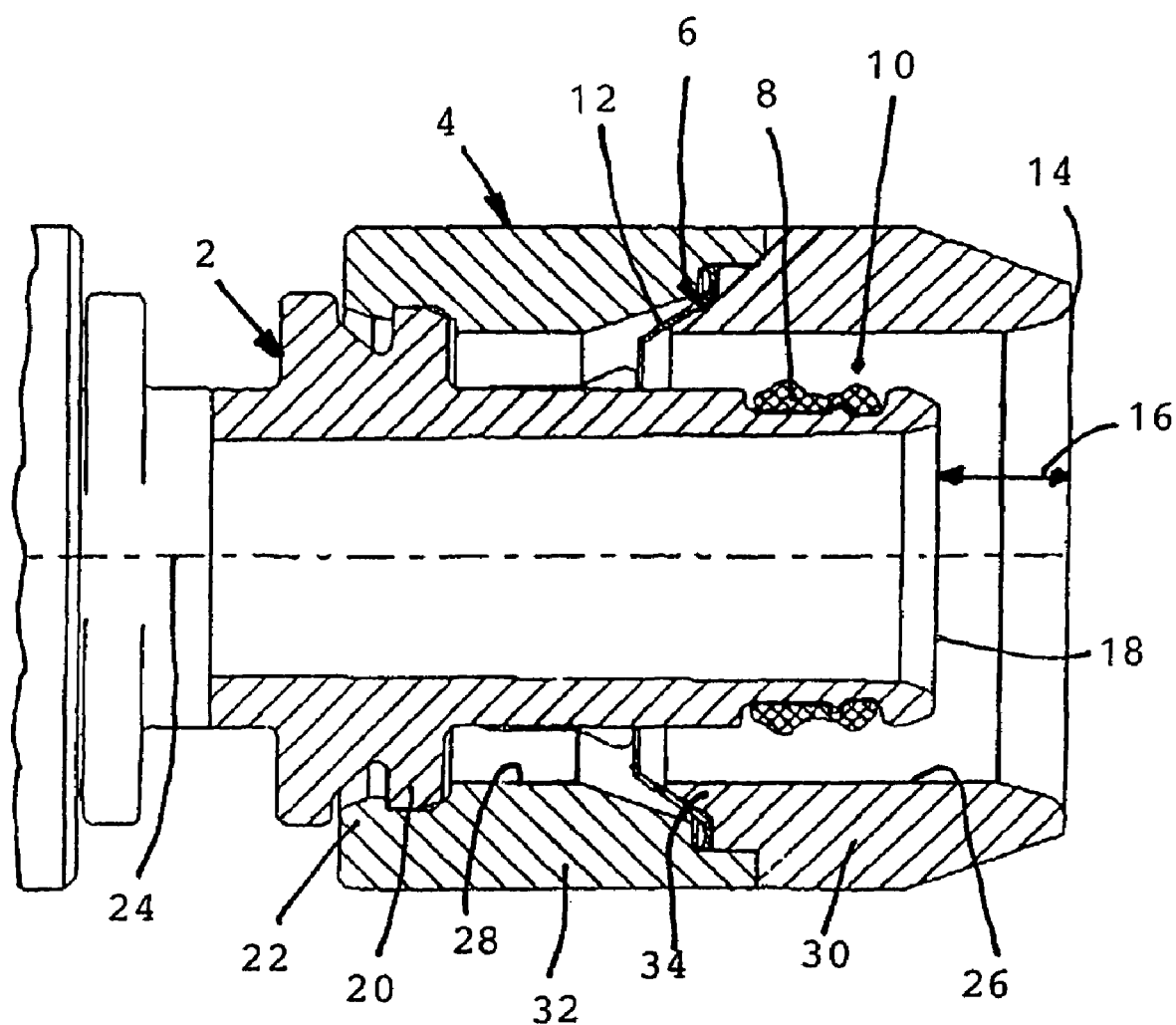
FIG. 1 is an axial section through the plug-in coupling.

The invention is described in greater detail in the following using the exemplary embodiments in the drawings without this constituting a restriction.

FIG. 1 is an axial section of the plug-in coupling, which contains a base body 2, a sleeve 4 joined thereto, an annular retaining element 6, and an annular sealing element 8. The sleeve encloses a portion of the base body 2, forming an annular gap 10 into which one end of a tube can be inserted, whereby the retaining element 6 with retaining claws 12 engages the exterior surface of the tube end with pre-stress and the sealing element 8 arranged on the exterior of the base body 2 is sealingly positioned against the interior surface of the tube end. The anterior free sleeve end 14 of the sleeve 4 projects for a pre-specified distance 16 beyond the free end 18 such that when the tube end is inserted into the annular gap 10 the tube end is securely guided and centered in terms of the plug-in coupling and there the sealing element 8 is prevented from being damaged, squeezed off, or even from being pressed away from the base body 2.

The sleeve 4 is securely joined to the base body 2, usefully via locking means 20, 22 that correspond to and/or engage in one another. As shown, the one locking means 20 of the base body 2 is embodied as a radial bar that engages in the other locking means 22, which is embodied as an annular groove of the sleeve 4. Alternatively, the base body 2 can have an annular groove for a bar of the sleeve 4 that is inwardly oriented. Although a lasting and/or non-detachable connection having locking means has proved particularly useful, in the framework of the invention the connection between the base body 2 and the sleeve 4 can also be embodied to be detachable, whereby in this case a screwed connection or a bayonet connection is possible.

It should furthermore be noted that the plug-in coupling can be a component of a fitting or can be embodied as such and likewise can be integrated into a fitting or other device such that the base body is embodied in a single part, for instance with the housing of the fitting.

In the direction of the longitudinal axis 24, the sealing element 8 is arranged at a distance from the area in which the retaining element 6 is provided. Due to the axial space, the retaining element 6 and the sealing element 8 can be dimensioned independently of one another, there being no need to worry about mutual interference in the different functions. The radially exteriorly arranged, preferably cylindrical interior surface 26 of the anterior part of the sleeve 4 thus facilitates precise and/or secure tube support in the area of the sealing element 8. Impermissible broadening of the tube end due to pressure and/or mechanical stresses in the area of the sealing element are prevented, and the required pressure by the sealing element against the interior surface of the tube end is maintained.

The posterior sleeve part 32 also contains an interior surface 28 that faces the inserted tube end. In a preferred manner, the interior diameter of this interior surface 28 is at least approximately the same size as that of the exterior diameter of the tube end to be inserted, in particular as the maximum exterior diameter as pre-specified by tolerances. This results in optimum guidance and stabilization of the tube end.

In contrast, the interior surface 26 of the anterior sleeve part 30 has an interior diameter that is larger than the interior diameter of the posterior sleeve part 32 in the area of its interior surface 28 by a pre-specified amount, in particular on the order of magnitude of up to several tenths of a millimeter. This reduces the inserting force to a minimum, on the one hand, and ensures optimum guidance and stabilization of the inserted end of the tube, which is preferably embodied as a compound tube.

Figure 2:
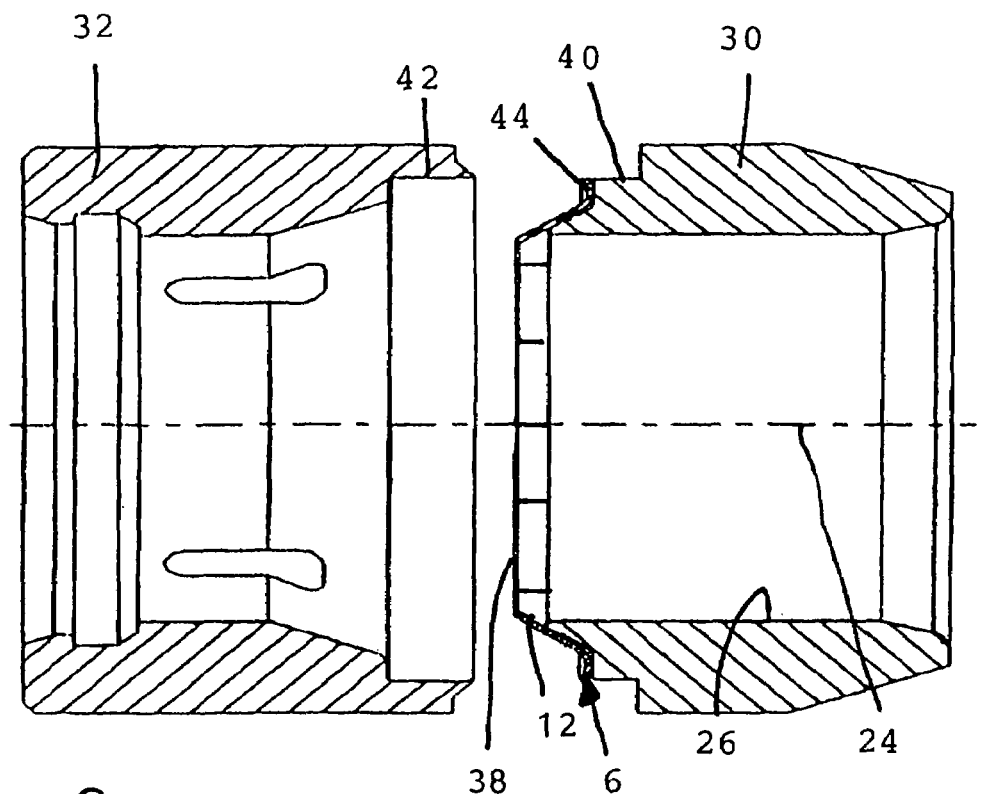
FIGS. 2, 3 are axial sections of the two sleeve parts and of the welded sleeve created thereby, including retaining element.
Figure 3:
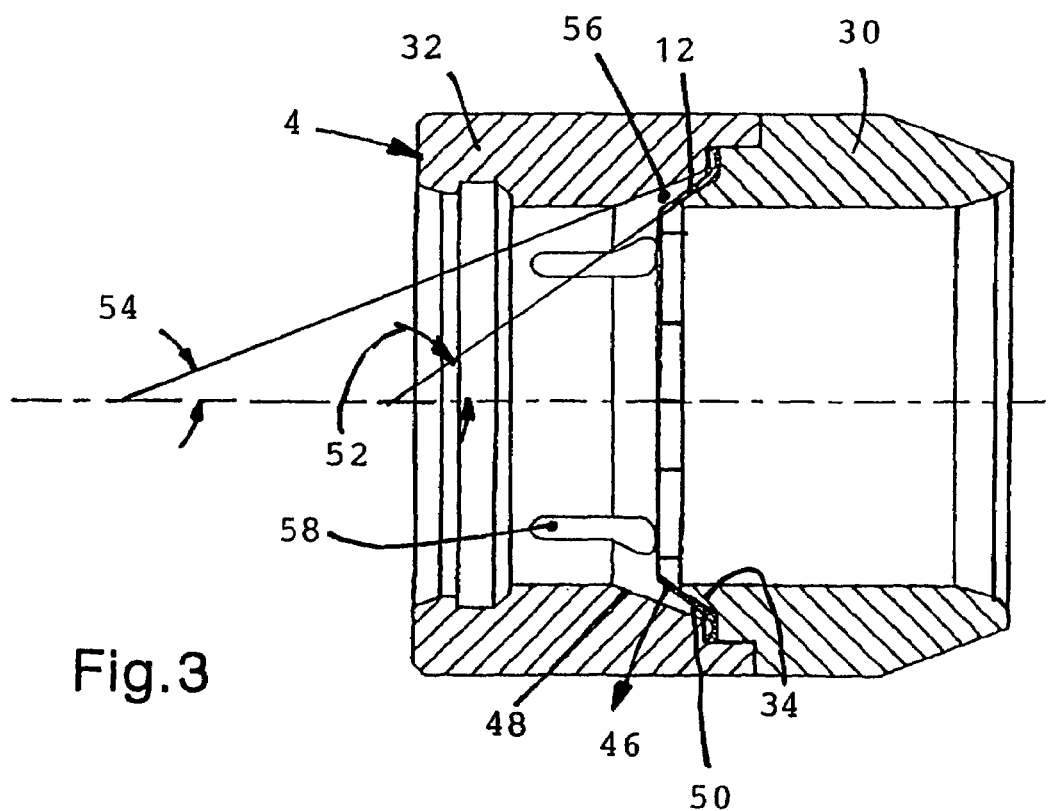

FIG. 2 depicts the first anterior sleeve part 30 and the second posterior sleeve part 32 prior to their being joined or welded. FIG. 3 depicts the finished sleeve 4 with the integrated retaining element 6 after the joint, in particular a weld joint, has been produced. The first sleeve part 30 contains a support body 34 for the retaining element 6 and/or its retaining claws 12, the free edges of which 38 are indicated only schematically here and are on a smaller radius than the radius of the interior surface 26 of the first, anterior sleeve part 30. When the tube end is inserted, the claw edges 38 are pressed radially outward and consequently, under clamping or pre-stress, engage the exterior surface of the tube end for the purpose of fixing the latter in the plug-in coupling.

The support body 34 is preferably embodied as a conical annular shoulder, in particular of the first anterior sleeve part 30, and/or is an integral component of the first sleeve part 30 and thus after the two housing parts 30, 32 have been combined is an integral component of the complete sleeve 4. While the two sleeve parts 30 32 are being joined, the retaining element 6 is centered with respect to the longitudinal axis 24 in a particularly useful manner by means of the support body 34, in particular the annular shoulder having a conical exterior surface. As can be seen, the first sleeve part 30 and the second sleeve part 32 have connecting parts 40, 42 that are matched to one another and/or that engage one another and that enable precise mutual orientation as well as simple and functional, in particular lasting, joining, preferably a weld joint, of the two sleeve parts 30, 32.

For the precise placement of the retaining element 6 between the two sleeve parts 30, 32, the retaining element 6 has radially outwardly an annular part 44 that is closed on the circumference and that is preferably arranged largely in one radial plane that is orthogonal to the longitudinal axis 24. As can be seen in particular in FIG. 2, the closed annular part 44, which thus does not have a slit that runs in the axial direction, is embodied curved somewhat spherically on the radial plane in the manner of a toroid. When the sleeve is assembled, this usefully results in a tolerance compensation, whereby the retaining element is also centered, in particular via the retaining claws 12 by means of the support body 34. Once joined, in particular once the material-fit weld joint has been produced, in accordance with FIG. 3 the sleeve 4 is a single-part and/or compact component in which the retaining element is integrated and/or precisely secured.

The retaining element 6 is also fixed both radially and axially with the closed annular part 44 in the sleeve 4, whereby the resiliently elastic retaining claws 12 are pressed outward in the direction of the arrow 46 when a tube end is inserted and thereafter act with pre-stress to securely clamp the exterior surface of the inserted tube end with a pre-specified clamping tension. The closed annular part 44 ensures that the retaining element 6 is immovably fixed, both axially and radially.

As can furthermore be seen from FIG. 3, the sleeve 4 and/or the second sleeve part 32 in the area of the retaining claws 12 has an interior surface part 48 that preferably expands conically in the direction of the free sleeve end 14 such that the resiliently elastic retaining claws 12 can pass through the radial expansion in the direction of the arrow 46. It must be expressly stated at this point that the retaining element 6 comprises a resiliently elastic material, in particular spring steel or the like.

The support body or conical annular shoulder 34 has an exterior positioning surface 50 for the retaining element or its retaining claws 12. The positioning surface 50 is preferably embodied largely conical and is situated at an angle 52 to the longitudinal axis 24, whereby when not stressed the retaining claws 12 are disposed at largely the same angle to the longitudinal axis 24. The angle 52 is pre-specified in the range of 20° to 45°, usefully 25° to 40°, preferably 28° to 35°, in particular 30 to 33°. The interior surface part 48 is arranged at an angle 54 such that when a tube end is inserted the retaining claws 12 can be spread unimpeded into the free space 56 that is limited radially outward by the interior surface part 48. The angle 54 is advantageously smaller than the angle 52 by a pre-specified factor, whereby the factor is in the range of 0.3 to 0.7, advantageously 0.4 to 0.6, and in particular approximately 0.5. It should also be mentioned that the sleeve 4 and/or the posterior sleeve part 32 contains at least one, usefully a plurality of, radial through-holes or viewing windows 58 through which it is possible to check that the tube end has been correctly and completely inserted into the plug-in coupling.

Figure 4:
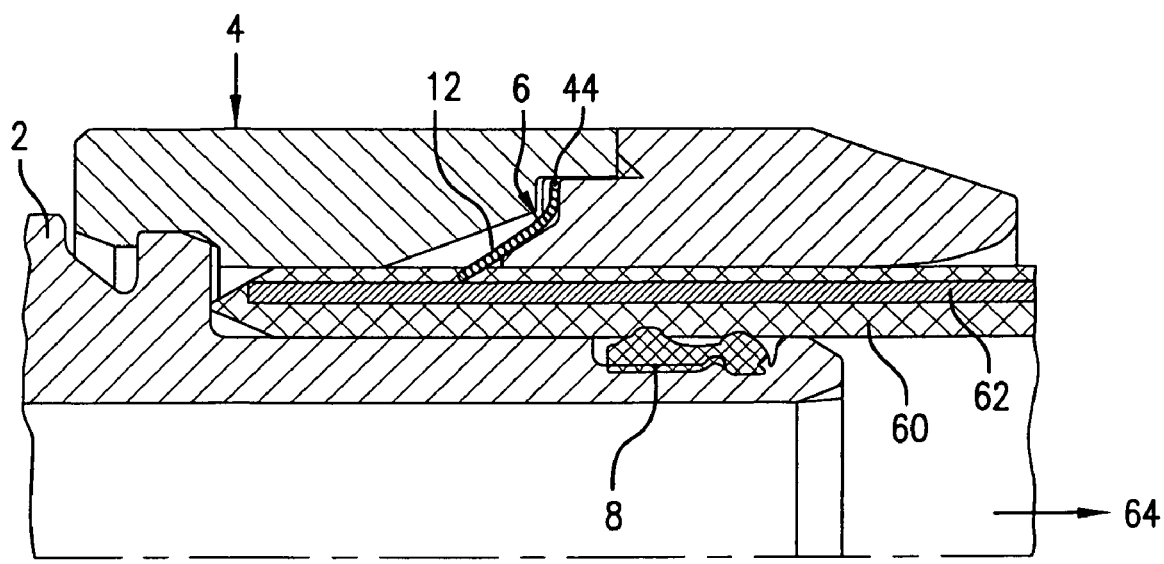
FIG. 4 provides a partial illustration and enlargement of the plug-in coupling with inserted tube end.

FIG. 4 is a partial and enlarged depiction of the plug-in coupling with a tube, the end 60 of which has been inserted into the annular gap between the base body 2 and the sleeve 4. The two sealing bulges of the sealing element 8 that are arranged radially exteriorly are positioned against the interior surface of the tube end 60, while the retaining claws 12 of the retaining element 6 engage the exterior surface of the tube end 60. The tube end 60 is embodied as a compound tube with an intermediate metal layer 62. Due to the inventive support body 34, which is preferably embodied as a conical annular shoulder, and in combination with the design of the length of the retaining claws, it is assured that the retaining claws 12 can be securely supported and cannot penetrate to the metal intermediate layer 62, damaging it, in particular in the case of tensile forces in the direction of the arrow 64 on the tube end 60.

Figure 5:
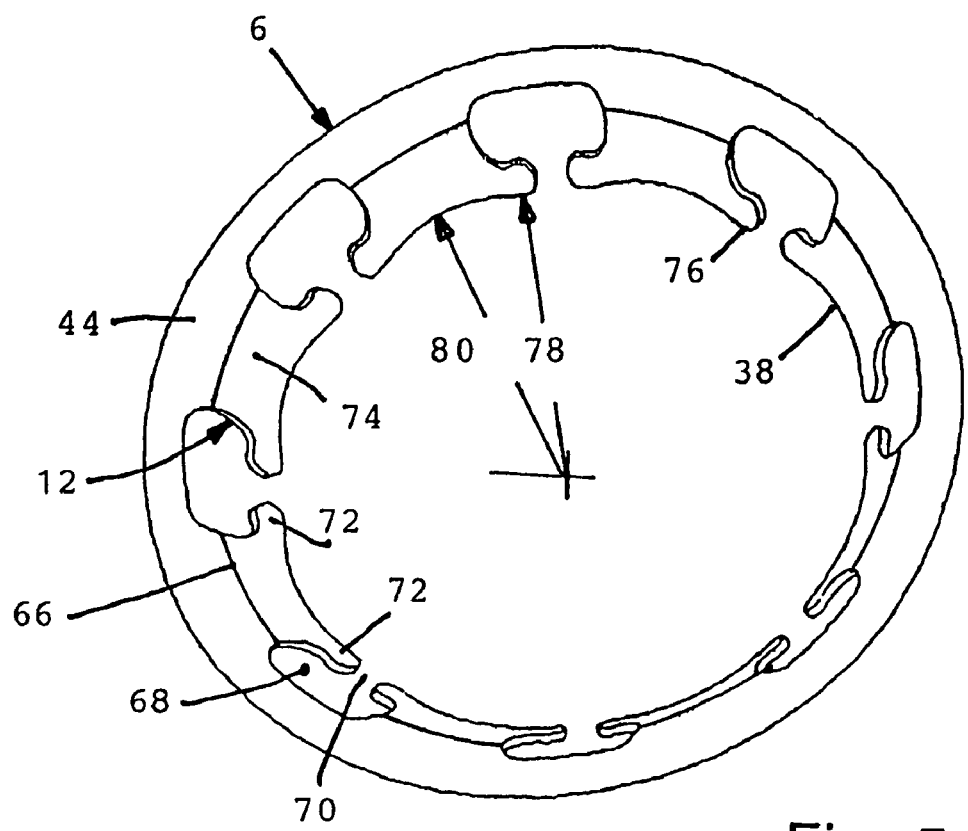
FIG. 5 is a perspective drawing of the retaining element.

FIG. 5 provides a view of the retaining element at a viewing angle that is inclined to the longitudinal axis. The retaining element 6 contains the annular part 44 closed over the circumference as well as eight scoop-shaped and/or arched retaining claws 12. The annular part 44 is arranged in the sleeve in a plane that is largely orthogonal to the longitudinal axis 24, which here is inclined to the plane of the drawing. As explained in the foregoing, the scoop-shaped retaining claws 12 are arranged inclined to the longitudinal axis 24 at a pre-specified angle, whereby there is an angling-off 66 between the annular part 44 and each of the retaining claws 12.

As can be seen in accordance with the retaining claws at the bottom of the drawing, the retaining claws 12 are arched in a pre-specified radius that is matched to the radius of the exterior surface of the tube end. Between the retaining claws 12, the retaining element 6 contains recesses 68, the corners of which are usefully rounded and which open in the direction of the claws edges 38 into open through-holes 72. The retaining claws 12 thus contain expansions 72 that extend to both sides in the circumferential direction relative to the free claw edges 20. At the closed annular part 44 and between the recesses arranged spaced apart in the circumferential direction, the retaining claws 12 embodied as resiliently elastic tongues then have a metal part 74 to which the aforesaid expansions 72 are connected.

Because of the predetermined arch or curvature, relative to the longitudinal axis 24, of the retaining claws 12 embodied in a scoop shape, the exterior edges 76 of the expansions 72 have a radius 78 to the longitudinal axis 24 that is smaller by a pre-determined amount than the radius 80 in the area of the center of the claw edges 38. Given the inventive in particular claw-shape and/or the rounding due to the claw edge 38 that engages the tube end, when inserted into the plug-in coupling the tube end first strikes the exterior edges 76 of the retaining claws 12.

Due to the special shape of the retaining claws, which has been described, the insertion force for the tube end is advantageously reduced, specifically preferably in combination with the comparatively long design and the lever arm of the resiliently elastic retaining element 12 that is arranged inclined to the longitudinal axis. Furthermore, due to the design of the retaining element, explained in the foregoing, tensile forces on the tube end in the direction out of the plug-in coupling cause the claw edge 38 to progressively penetrate into the tube and increase the retaining force. In addition, it is explicitly noted that due to the arched design of the retaining claws 12, the latter have high dimensional stability.

Since the retaining element 6 is immovably fixed in the sleeve axially and radially by means of the closed annular part 44, when forces act thereupon undesired movements of the retaining element 6 relative to the sleeve and/or the tube end are prevented, and thus resulting local overstressing of the retaining claws 12 is prevented and they are prevented from penetrating too deep into the tube end.

Figure 6:
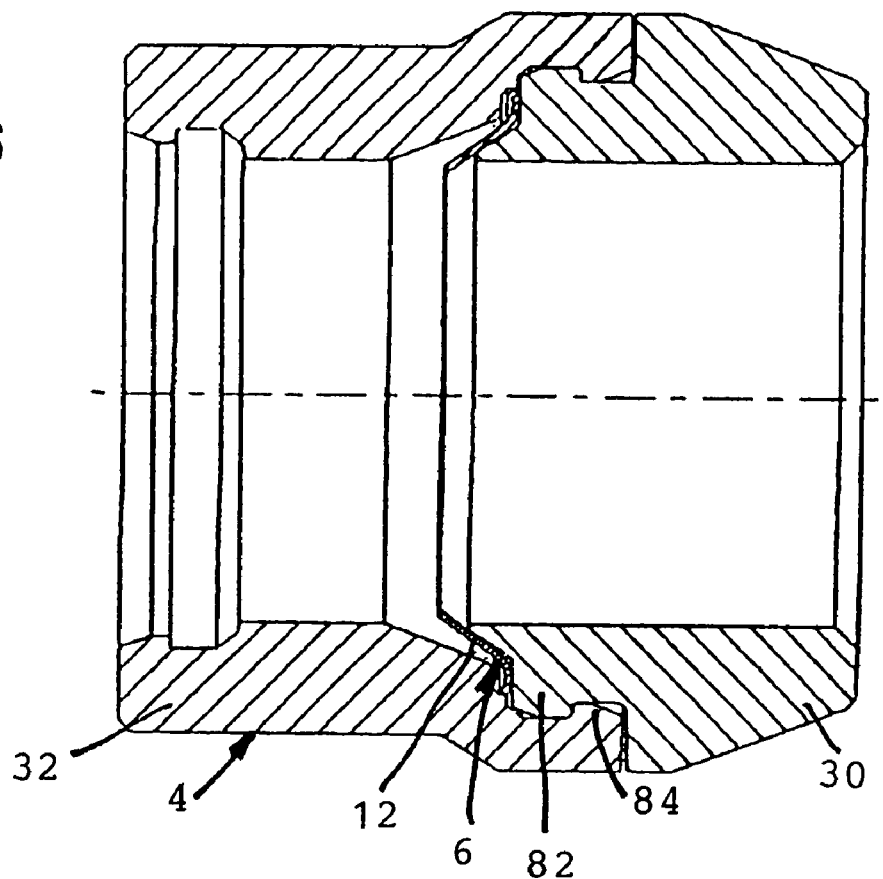
FIG. 6 is an axial section of an alternative exemplary embodiment of the sleeve.

FIG. 6 illustrates an alternative embodiment of the sleeve 4, the sleeve parts 30, 32 of which are joined by means of a clip or snap-in connection. The sleeve parts 30 and 32 have locking elements 82, 84 that correspond to and engage one another, whereby in accordance with the explanations in the foregoing the retaining element 6 is positioned securely between the two sleeve parts 30, 32. Otherwise the statements in the foregoing still apply.

Figure 7:
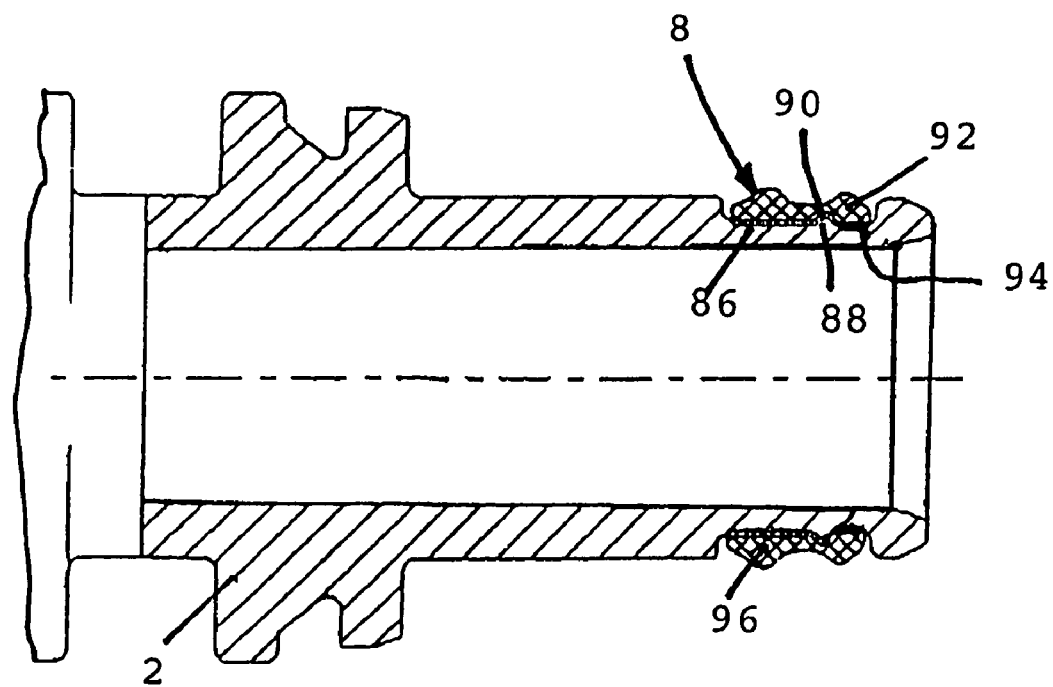
FIG. 7 is an axial section through the base body.

FIG. 7 is an axial section of a special embodiment of the base body 2 with the sealing element 8 arranged in an annular groove 86. The annular groove 86 contains an annular body 88 that is outwardly oriented and that engages in a corresponding and radially inwardly positioned recess 90 of the sealing element 8.

In a preferred manner, there is an adhesive connection 94 between the anterior section 92 of the sealing element 8 and the annular groove 86. In contrast, the posterior section 96 of the sealing element 8, which follows in the direction of the interior of the plug-in coupling or base body 2, is arranged free and/or loose in the annular groove 86. Due to the adhesive connection 94 of the sealing element 8, which is present only in the area of the anterior section 92, the sealing element 8 is held securely in place while the tube end is inserted. On the other hand, there is no increase in the insertion forces, because the posterior section 96 of the sealing element 8 is flexible and/or movable in the axial direction.

The sealing element 8 is provided with slide means, at least radially on the exterior, specifically for instance it is provided during assembly with fat or the like or is coated with an appropriate lubricant during manufacture. It should be noted that forces during insertion of the tube end are kept low due to the lubricant, and furthermore damage to or even destruction of the sealing element 8 is prevented.

Figure 8:
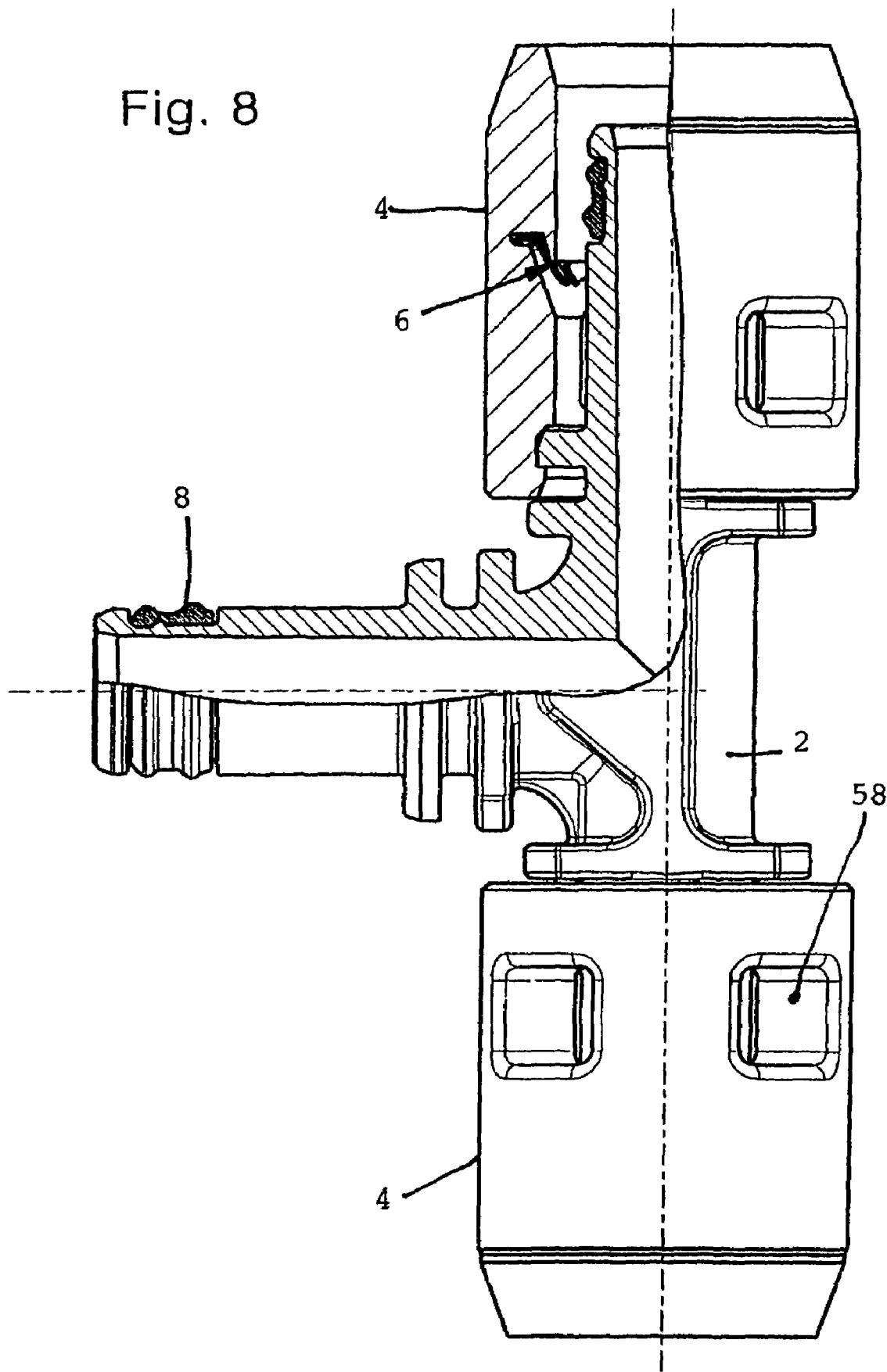
FIG. 8 is one exemplary embodiment of the plug-in coupling in the shape of a T-piece.

FIG. 8 provides a partial side view and partial cut-away view of a special embodiment of the inventive plug-in coupling in the form of a T-part for connecting three tube ends. The three coupling parts are embodied to match, whereby the two coaxial coupling parts have the sleeves 4, while the left-hand coupling part is illustrated without the sleeve for the purpose of clarifying the structural embodiment of the base body 2. The T-shaped base body 2 and the sleeves 4 advantageously comprise plastic.

In accordance with the statements made in the foregoing, each of the one-piece sleeves 4 comprises the two sleeve parts, with the integrated retaining element 6, that have been joined in a material fit in particular by welding. The preferably four viewing windows 58 embodied as through-holes are easy to see here. The statements made in the foregoing apply as appropriate.

Figure 9:
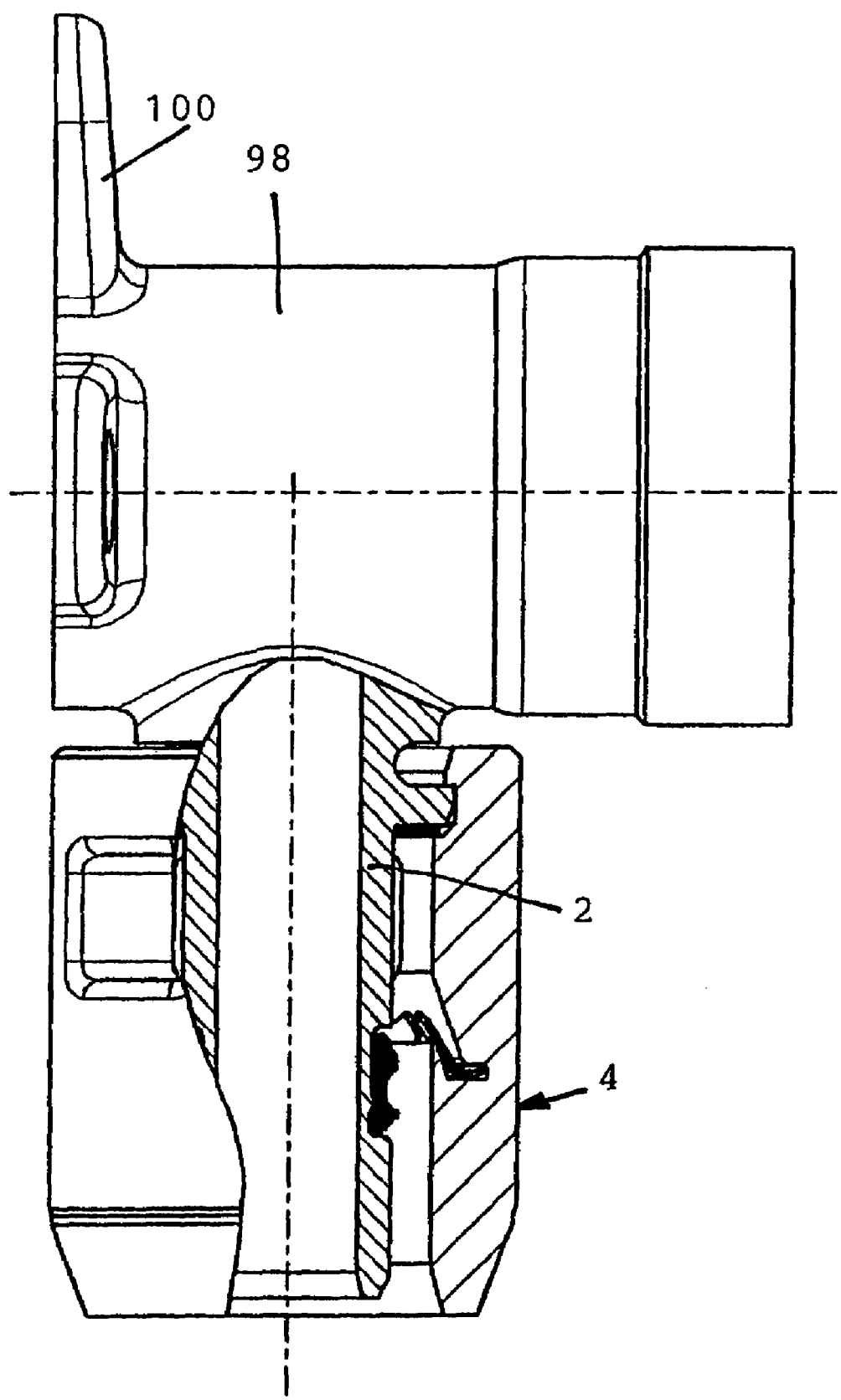
FIG. 9 is another exemplary embodiment of the plug-in coupling as a wall disk.

FIG. 9 illustrates another exemplary embodiment of a fitting embodied as a so-called wall disk with a plug-in coupling containing a sleeve 4. The base body 2 is a component of the fitting body 98, which is embodied for attaching another tube, in particular a metal tube, via a connecting device that is not shown here and that is provided in the interior of the fitting body 98, preferably a threaded connector. The fitting body 98 and the base body 2 of the plug-in coupling, embodied integrally therewith, preferably comprise metal, in particular brass, while the inventive plug-in coupling with the sleeve 4 that preferably comprises plastic is fundamentally in agreement with the exemplary embodiments explained in the foregoing. The fitting base body 98 contains a flange-like fastening body 100 for connecting to a wall, a mounting system, or the like.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A coupling comprising:
   a base body being partially inserted into a tube end;
   a sealing element disposed on said base body;
   a sleeve comprising axially opposing anterior and posterior sleeve parts;
   said sleeve parts each including axially opposing anterior and posterior ends and an interior surface;
   said interior surface of said anterior part supporting the tube end;
   said sleeve parts being permanently and fixedly connected at a radial lip;
   a support body disposed on said posterior end of said anterior sleeve part;
   said support body including an exterior positioning surface disposed at a pre-determined angle so that a radius of said surface increases toward said anterior end of said anterior sleeve part;
   an annular gap disposed between said base body and said sleeve for receiving the tube end;
   said interior surface of said posterior sleeve part being spaced from said exterior positioning surface of said support body for forming a free space;
   a retaining element disposed axially against and radially exterior to said support body;
   said retaining element including a closed annular part disposed radially adjacent to said radial lip connecting said sleeve parts;
   said retaining element including elastic retaining claws disposed against said exterior positioning surface of said support body for fixing the tube end to said coupling; and
   said retaining claws being movable in said free space.

2. The coupling of claim 1, wherein:
   said closed annular part of said retaining element is disposed in a plane that is orthogonal to a longitudinal axis of said sleeve; and
   said retaining claws being disposed at an angle towards the interior of the coupling in a predetermined area of said retaining element.

3. The coupling of claim 1, wherein said sleeve parts are joined at a weld joint.

4. The coupling of claim 1, wherein said support body is an annular shoulder, and said exterior positioning surface is conical.

5. The coupling of claim 1, wherein:
said retaining claws of said retaining element comprise:
- a scoop-shape; and/or
- an arch shape disposed about the longitudinal axis; and/or
- a plurality of pairs of through-holes and circumferential recesses, said pairs disposed in the circumferential direction, each recess disposed radially exterior to and extending from a paired through-hole, each through-hole being substantially smaller than a paired recess.

6. The coupling of claim 5, wherein:
said retaining claws include a center part connected radially to said annular part, said retaining claws including expansions disposed towards an inner edge of said claws.

7. The coupling of claim 6, wherein:
said recesses are disposed between adjacent center parts; and
said through-holes being circumferentially disposed between said expansions of adjacent retaining elements, said through-holes being circumferentially smaller than a paired recess.

8. The coupling of claim 1, wherein:
said base body comprises an annular groove disposed adjacent to a free end of said base body;
said sealing element being disposed in said annular groove;
said sealing element including anterior and posterior sections, said anterior section of said sealing element being adhesively connected to said base body; and
said posterior section of said sealing element being movable parallel to the direction of said longitudinal axis in said annular grove.

9. The coupling of claim 1, wherein said retaining claws being movable and/or spreadable in said free space when said tube end is inserted into said coupling.

* * * * *